(12) United States Patent
Marini

(10) Patent No.: US 11,034,105 B2
(45) Date of Patent: Jun. 15, 2021

(54) MULTI-USE SEALANT LIQUID CONTAINER FOR AN INFLATABLE ARTICLE REPAIR KIT

(71) Applicant: TEK GLOBAL S.R.L., Pesaro (IT)

(72) Inventor: Maurizio Marini, Pesaro (IT)

(73) Assignee: TEK GLOBAL S.R.L., Pesaro (IT)

( * ) Notice: Subject to any disclaimer, the term of this patent is extended or adjusted under 35 U.S.C. 154(b) by 168 days.

(21) Appl. No.: 16/304,981

(22) PCT Filed: Jun. 8, 2017

(86) PCT No.: PCT/IB2017/053398
§ 371 (c)(1),
(2) Date: Nov. 27, 2018

(87) PCT Pub. No.: WO2017/212438
PCT Pub. Date: Dec. 14, 2017

(65) Prior Publication Data
US 2020/0324496 A1 Oct. 15, 2020

(30) Foreign Application Priority Data
Jun. 8, 2016 (IT) .................... 102016000058686

(51) Int. Cl.
*B29C 73/16* (2006.01)
*B29L 30/00* (2006.01)

(52) U.S. Cl.
CPC ......... *B29C 73/166* (2013.01); *B29L 2030/00* (2013.01)

(58) Field of Classification Search
CPC ............... B29C 73/166; B29L 2030/00; B29L 2031/26; B65D 83/14; B65D 83/303; B65D 83/40; B67D 1/04
(Continued)

(56) References Cited

U.S. PATENT DOCUMENTS

2016/0016559 A1 1/2016 Wang
2016/0121563 A1* 5/2016 Chou .................... B29C 73/025
141/38
(Continued)

FOREIGN PATENT DOCUMENTS

CN 102673531 9/2012
CN 102673532 9/2012
(Continued)

*Primary Examiner* — Vishal Pancholi
*Assistant Examiner* — Robert K Nichols, II
(74) *Attorney, Agent, or Firm* — Leason Ellis LLP

(57) ABSTRACT

A sealant liquid container for repairing an inflatable article, preferably a tire, includes a casing defining an inner volume for a sealant liquid, an inlet port for the inlet of a pressurized gas into the inner volume, and an outlet port for the injection of the sealant liquid following pressurization of the inlet port. The container further includes a closing unit configurable between a closing position in which the sealant liquid is retained in the inner volume and an opening position reached following pressurization of the inlet port in which the inlet port and the outlet port are connected by the inner volume. In particular, the container further includes a second inlet port connected to the outlet port in parallel to the first inlet port and a duct for connecting the second inlet port to the outlet port and surrounded by the inner volume.

10 Claims, 4 Drawing Sheets

(58) Field of Classification Search
USPC .................. 222/394, 399; 141/100–105, 38
See application file for complete search history.

(56) References Cited

U.S. PATENT DOCUMENTS

2016/0325511 A1* 11/2016 Marini .................. B29C 73/166
2016/0332397 A1* 11/2016 Marini ................. B65D 83/303

FOREIGN PATENT DOCUMENTS

| | | |
|---|---|---|
| CN | 104772916 | 7/2015 |
| DE | 20 2015 10588 | 12/2015 |
| EP | 2 286 984 | 2/2011 |
| JP | 2008049598 | 3/2008 |
| WO | WO 2009/052576 | 4/2009 |
| WO | WO 2015/114564 | 8/2015 |

\* cited by examiner

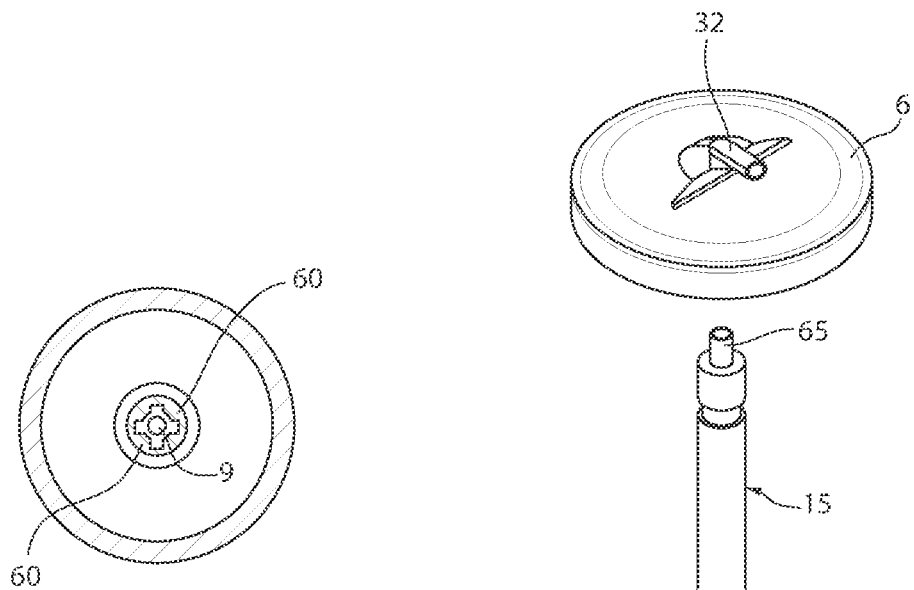
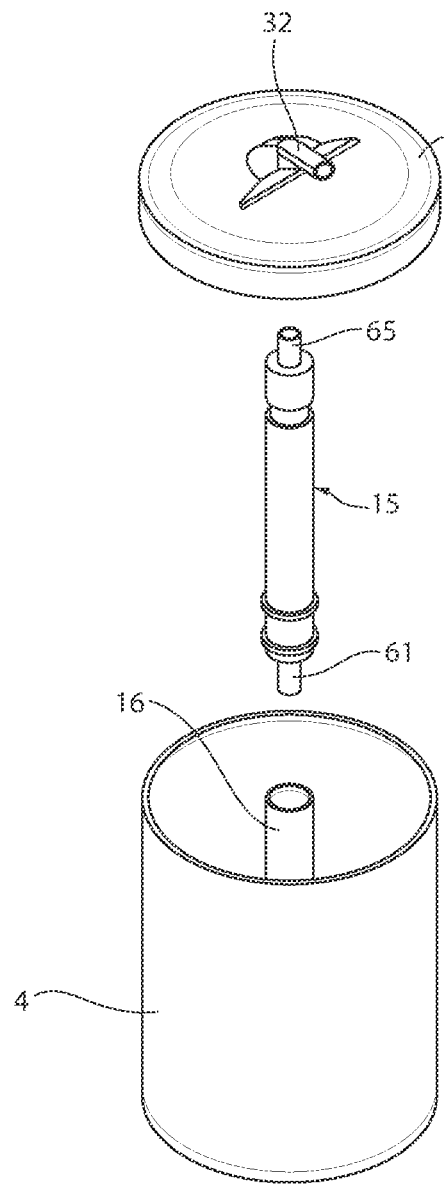
FIG. 3
FIG. 4

MULTI-USE SEALANT LIQUID CONTAINER FOR AN INFLATABLE ARTICLE REPAIR KIT

CROSS-REFERENCE TO RELATED PATENT APPLICATIONS

This application is a U.S. National Phase Application under 35 U.S.C. § 371 of International Patent Application No. PCT/IB2017/053398, filed Jun. 8, 2017, which claims the priority of Italian Application No. 102016000058686, filed Jun. 8, 2016, which is incorporated by reference as if expressly set forth in its entirety herein.

TECHNICAL FIELD

The present invention relates to a sealant liquid container for an inflatable object repair kit, in particular tires.

BACKGROUND ART

Sealant liquid containers are known, comprising a pressurized air inlet and an outlet for injecting the sealant liquid into a tire following the action of the pressurized air entering the inlet and generated by a pressure source, such as a compressor.

In such containers, the pressurized air acts as an opening agent for an inner valve which retains the sealant liquid in the container when not in use, and as an extraction agent of the sealant liquid for the injection into an inflatable article, such as a tire. In particular, the injection of the sealant liquid occurs when the container is connected to a base comprising a compressor and a releasable mechanical and fluid connection to keep the container in the position of use and to provide the pressurized air. The combination of the container and of the base forms a kit for repairing and inflating inflatable articles.

A need to increase the functions of the sealant container is felt, for example so as to allow the passage of a flow of pressurized air only for inflating the inflatable article.

EP-A-2286984 on behalf of the same applicant, refers to a multi-use container comprising an air inlet only for inflating the inflatable article. The air inlet is directly fitted on an outlet tube of the container, which is located in close proximity to the releasable connection with the base of the kit. This places project constraints when the outlet tube is distal from the releasable connection.

DISCLOSURE OF INVENTION

The object of the present invention is to produce a container for a sealant liquid capable of solving the above-mentioned problem.

The object of the present invention is achieved by a sealant liquid container according to claim 1.

BRIEF DESCRIPTION OF THE DRAWINGS

The invention will now be described with reference to the accompanying drawings, which illustrate an example of a non-limiting embodiment, wherein:

FIG. 3 is a section of the container from the present invention according to the radial plane having a trace III-III in FIG. 1;

FIG. 4 is an exploded perspective view of the container of FIG. 1; and

BEST MODE FOR CARRYING OUT THE INVENTION

Figure 1:
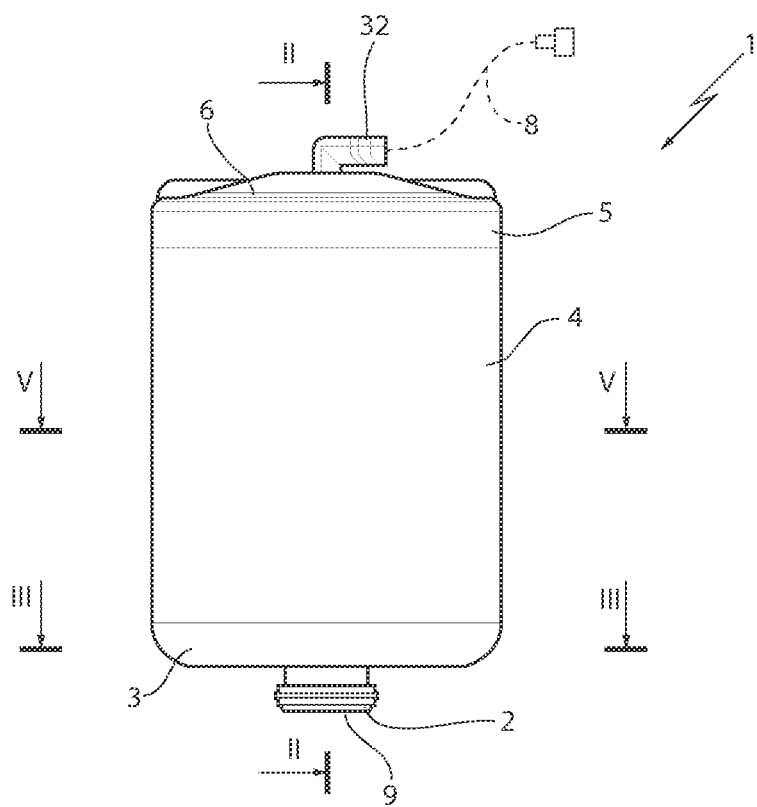
FIG. 1 is a lateral view of a sealant liquid container according to the present invention.

In FIG. 1, 1 illustrates as a whole, a container for a sealant liquid having an inlet port 2, a bottom 3 defining the inlet port 2, a lateral wall 4 raised from the bottom 3, and a head portion 5 opposite to the bottom 3 with respect to the lateral wall 4.

The head portion 5 comprises a head wall 6 fixed to the lateral wall 4 to define an inner volume 7 and a flexible outlet tube 8 (schematized) which can be connected directly to an inflatable article, preferably to a tire. The bottom 3, the lateral wall 4, and the head wall 6 define a casing for containing a predetermined amount of sealant liquid suitable for repairing an inflatable article, such as a tire.

The container 1 further comprises a second inlet port 9 fluidly arranged parallel to the outlet tube 8.

From the opposite longitudinal side of the flexible outlet tube 8, the inlet port 2 is surrounded by an annular wall 12a which carries a first seal ring 11a, for example an o-ring, and the second inlet port 9 is surrounded by a second annular wall 12b which carries a second seal ring 11b. The inlet port 2 is ring-shaped and surrounds, being concentric, the second inlet port 9.

The inlet ports 2, 9 and the annular walls 12a, 12b define a projection R of the bottom 3 which preferably snap-connects to a base of a repair kit as will be described in the following.

In the container 1, the inner volume 7 houses a closing unit 13 which carries the inlet port 2 to an outlet port 14 and comprises a mobile element 15 configurable in a closing position in which the sealant liquid is retained and stored in the inner volume 7 and the container 1 can be available for use, and an opening position reached following the pressurization of the inlet port 2 in which the inlet port 2 and the outlet port 14 are connected by the inner volume 7. The outlet port 14 is in turn connected to the flexible outlet tube 8 so as to inject sealant liquid into a tire when the inlet port 2 is pressurized and when the closing unit 13 is configured in the opening position. The inlet port 2 and the outlet port 14 are on opposite sides with respect to the inner volume 7 and the sealant liquid, during the injection, leads through at least a section from the bottom 3 to the head wall 6 inside the closing unit 13.

In the closing position of the mobile element 15, the outlet port 14 is connected to the second inlet port 9 by a duct C defined by the mobile element itself. Both in the opening position and in the closing position of the mobile element 15, the duct C is fluidly insulated with respect to the inlet port 2 so as to avoid bypass when the pressurized air is to be sent into the inner volume 7. According to an embodiment, in order to obtain this function, the annular wall 12b is connected to the annular wall 12a by one or more radial bridges 60 and the mobile element 15 comprises a projection 61 sliding in the annular wall 12b, a seal ring 62 being interposed and being the duct C partially defined by the projection 61. In any functioning position of the mobile element 15, the projection 61 slides in the annular wall 12b and the seal ring 62 prevents that pressurized air, entering the inlet port 2, may pass through the duct C and that, pressurized air entering the second inlet port 9 may escape towards the inlet port 2.

Preferably, the mobile element 15 moves in a rectilinear direction defined by a guide 16 preferably arranged between the inlet ports 2, 9 and the outlet port 14. Advantageously, the guide 16 is tubular and houses the mobile element 15 which carries a plurality of seal rings sliding on the guide 16.

The mobile element 15 defines a first passage 17, in particular a duct, which leads into an inlet 18 of the closing unit 13 and a second passage 19, in particular a duct which leads into an outlet 20 of the closing unit 13. Furthermore, in the opening position (not illustrated), the passage 17 leads into the inner volume 7 through an opening 21 defined by the guide 16 and the passage 19 leads into the inner volume 7 by an opening 22 also defined by the guide 16. In particular, the opening 21 is closer to the outlet 20 of the opening 22 in the longitudinal movement direction of the mobile element 15 along the guide 16. Preferably, the ducts 17,19 are on opposite transverse sides with respect to the duct C.

Figure 2:
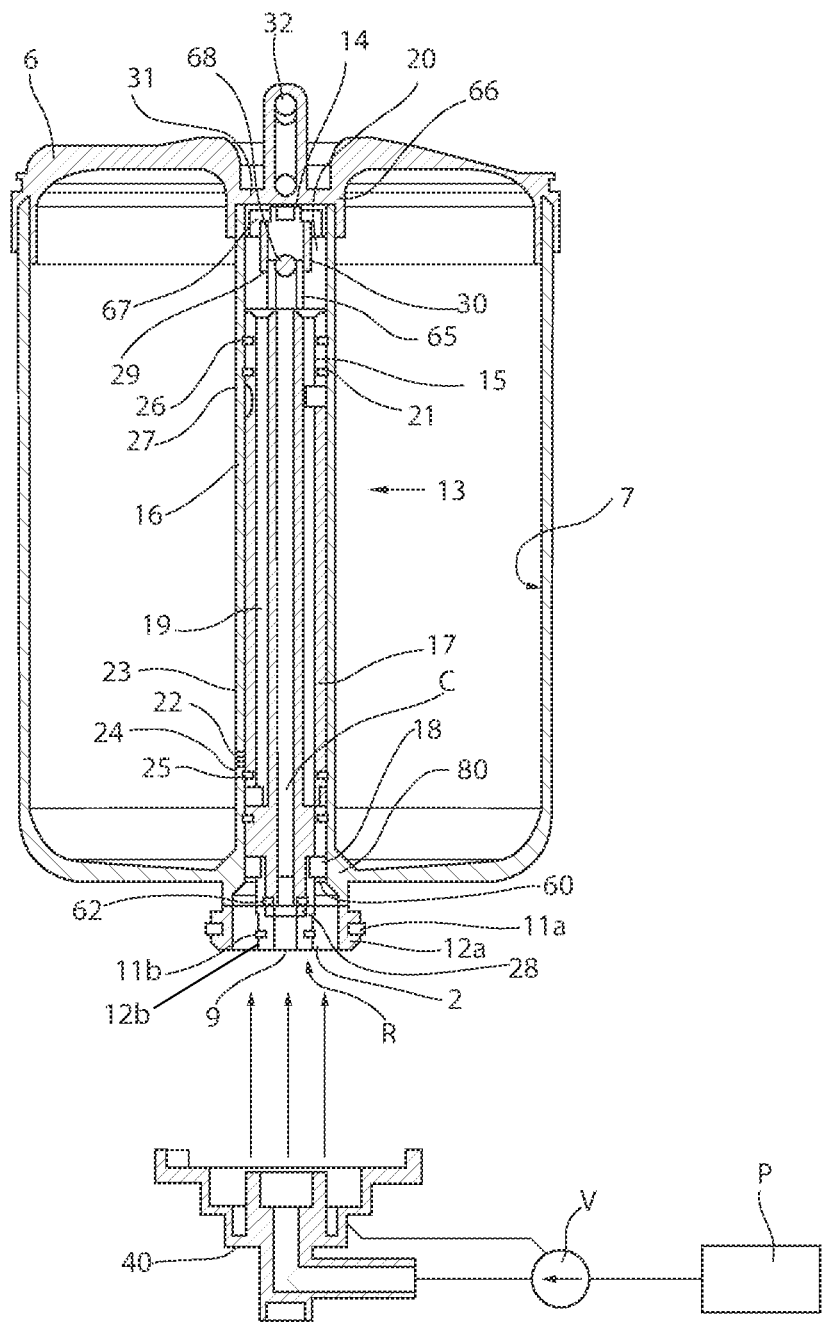
FIG. 2 is a section of the container from the present invention according to the longitudinal plane having a trace II-II in FIG. 1.

The stroke of the mobile element 15 and the position of the seal rings depends on the position of the openings 21, 22. In FIG. 2 the position of the rings 23, 24 are longitudinally spaced apart so as to be on opposite sides with respect to the opening 22 and so as to prevent the sealant liquid from flowing inside the guide 16. A third seal ring 25 is proximal to the inlet 18 with respect to the seal rings 23, 24 so as to convey the sealant liquid in the passage 19 when the mobile element 15 is in the opening position.

The mobile element 15 carries, furthermore, two other seal rings 26 and 27 spaced apart in the direction so as to be located on opposite sides with respect to the opening 21 when the mobile element 15 is in the closing position (FIG. 2). The guide 16 has continuous walls at least in the contact area with the seal rings 23-27 so that, when the closing unit 13 is in the closing position, the openings 21, 22 are sealed with respect to the inlet 18 and to the outlet 20. Furthermore, in the opening position, the seal ring 25 insulates the opening 22 from the inlet 18.

The container 1 can be produced by friction welding for components made by injection and moulding of a plastic material. Preferably, the bottom 3, the lateral wall 4, the annular walls 12a, 12b, the radial bridges 60 and the guide 16 are produced in a single hollow body. The wall 6 is produced by moulding in one body. In addition, the mobile element 15 is mounted in the guide 16 in the closing position and the predetermined amount of sealant liquid for the repair is poured into the hollow body defined by the bottom 3 and by the lateral wall 4. Finally, the head wall 6 is welded onto the hollow body.

In order to delimit the closing position of the mobile element 15 in particular during the assembly, a stop 28 is provided, preferably arranged within the projection R, even more preferably defined by the annular wall 12b, to receive in abutment the projection 61.

In order to delimit the opening position of the mobile element 15, a stop 29 is preferably provided, defined by a tubular element 30 of the head wall 6 concentric to the guide 16. Similarly to the structure of the mobile element 15 near the inlet ports 2, 9, the mobile element 15 comprises a second projection 65 defining a portion of the duct C and sliding inside the tubular element 30. The guide 16 has a diameter larger than that of the tubular element 30 and is fitted in a dedicated embossment 66 of the head 6 to be welded or otherwise connected in use in a fluid-tight manner for the sealant liquid or compressed air when the lateral wall 4 is also welded. The outlet 20 of the closing unit 13 has an annular shape and fluidly communicates with the outlet port 14 by gaps 67 carried by the lateral wall 30 and the projection 65 is surmounted by a shutter 68. When the gaps 67 are pressurized, the pressure closes the shutter 68 to prevent a flow from flowing through the duct C towards the second inlet port 9. When the duct C is pressurized, the shutter 68 is opened and the duct C is connected to the outlet port 14.

The head wall 6 defines, furthermore, a cavity 31 of the head wall 6 facing towards the outside environment. Preferably, within the cavity 31, an end portion of the flexible outlet tube 8 is mechanically connected, for example by radial interference, to a connector 32.

In use, the projection R of the container 1 is fluidly and mechanically releasable on a connector 40, which connects the first and the second inlet ports 2, 9 to a compressor P by a selector valve V. The container 1 is produced and is connected to the connector 40 with the mobile element 15 in the closing position (FIG. 2). When the compressor is activated and the selector valve sends pressurized air to the inlet port 9 and, at the same time, disconnects the inlet port 2 from the compressor P (FIG. 2), the outlet port 14 and the connector 32 receive pressurized air and the shutter 68 is opened. The outlet 20 and the passage 19 are also pressurized, but the seal ring 24 prevents air leaks towards the inner volume 7. Furthermore, the pressurization of the outlet 20 increases the load of the projection 61 against the stop 28 but does not move the mobile element 15.

When the selector valve V is switched on to supply pressurized air to the inlet port 2, the mobile element 15 moves towards the head 6 until the passage 17 is not in fluid communication with the inner volume 7. When the passage 17 leads into the opening 20, and at the same time the passage 19 leads into the opening 22, the inner volume 7 is pressurized and the pressure inside the container 1 pushes the sealant liquid towards the outlet port 14 through the opening 22, which is located near the bottom 3. As the sealant liquid is extracted from the inner volume 7, the pressurization of the outlet 20 by the gaps 67 compresses the shutter 68 so that first the sealant liquid and then the pressurized air are directed towards the outlet port 14 and not towards the duct C. The shutter 68 therefore operates as a check valve and may or may not be pre-loaded in a closing position by a spring.

If in the above situation the user switches the valve V to the inflation-only position (illustrated in FIG. 2), the pressurized air may flow backwards through the first and second passages 17, 19. To reduce the amount of the air flow or to block the air flow, the container 1 comprises a check valve 80 arranged along the fluid line between the inlet port 2 and the gaps 67. Preferably, the check valve is membrane-type and is arranged between the inlet port 2 and the first passage 17, so as to hinder the air possibly leaving the inlet 18. Preferably, the membrane valve rests on the bridges 60.

In use, when the user selects the selector valve V in the inflation-only position schematically illustrated in FIG. 2, the pressurized air flows through the duct C and the mobile element 15 remains in the position which closes the inner volume 7.

When the selector valve V is switched on by the user to supply the inlet port 2, the mobile element 15 is moved by the pressure and the sealant liquid flows in the passage 19 towards the tube 8. After the sealant has been injected, the container 1 together with the tube 8 are replaced.

The container 1 according to the present invention allows the following advantages to be obtained. The duct C is surrounded by the inner volume 7 and thus the connection interface of the container with its own pressure source is simplified. In addition, the duct C is protected by the container 1, in particular by the lateral walls 4.

The container 1 is designed to be produced by friction welding to increase the pressure strength and reduce the risk of unwanted leakage of the sealant liquid.

The shutter 68 delimits the section of the duct C which is not contaminated by the sealant liquid during use. In addition, after injecting the sealant liquid, the container 1, with its own flexible tube 8, is replaced with a new container: in this manner no maintenance operation is required, e.g. cleaning traces of sealant liquid.

It is also clear that it is possible to provide modifications or alternatives to the container 1 described and illustrated herein without departing from the scope of protection as described in the appended claims.

In particular, the connector 40 and the selector valve V can also be used in kits not comprising a compressor but however are suitable to be connected to a pressurized air source such as a pneumatic brake system of a heavy vehicle. In this case, the selector valve V is connected in a releasable manner to the pressure source.

Figure 5:
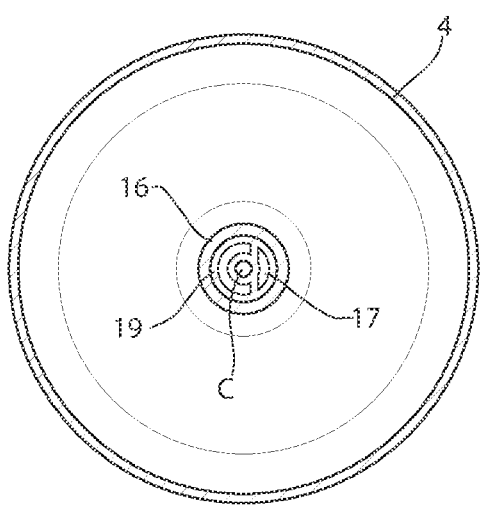
FIG. 5 is a section of the container of the present invention not to scale, according to the radial plan having a trace V-V in FIG. 1.

As illustrated in FIG. 5, the cross section of the passage 17 for the pressurized air has an area smaller than that of the passage 19 supplying the sealant liquid. Other configurations are possible.

The invention claimed is:

1. A sealant liquid container for repairing an inflatable article, the container, comprising:
   a casing (3, 4, 6) defining an inner volume (7) for a sealant liquid;
   a first inlet port (2) for the inlet of a pressurized gas into the inner volume (7);
   an outlet port (14) for injection of the sealant liquid following pressurization of the inlet port (2);
   a closing unit (13) which can be configured to move between a closing position in which the sealant liquid is retained in the inner volume (7) and an opening position reached following pressurization of the inlet port (2) in which the inlet port (2) and the outlet port (14) are connected by means of the inner volume (7); and
   a second inlet port (9) connected to the outlet port (14) parallel to the first inlet port (2) and a duct (C) for connecting the second inlet port (9) to the outlet port (14) and surrounded by the inner volume (7).

2. A container according to claim 1, wherein the duct (C) is defined by the closing unit (13) in the closing position.

3. A container according to claim 2, wherein the closing unit (13) comprises an inlet (18) fluidly connected to the inlet port (2) and an outlet (20) fluidly connected to the outlet port (14) and at least one passage (17; 19) for connecting to each other inlet and outlet (18, 20) so that the pressure at the inlet port (2) is transmitted to the outlet port (14), and wherein the duct (C) is parallel to the at least one passage (17; 19) with respect to the outlet port, a check valve (68) being arranged between the second inlet port (9) and the outlet port (14) and closed when the pressure at the inlet port (2) is transmitted to the outlet port (14).

4. A container according to claim 3, wherein the closing unit (13) comprises a mobile element (15) sliding along a guide (16), and the passage (17; 19) and the duct (C) are defined by said mobile element (15).

5. A container according to claim 4, wherein the mobile element (15) defines a further passage (19; 17), said passage (17) fluidly connecting the inlet (18) to the inner volume (7) and said further passage (19) connecting the inner volume (7) to the outlet (20).

6. A container according to claim 5, wherein said passage and further passage (17, 19) are fluidly connected to the inner volume (7) by means of a first and a second port (21, 22) respectively, the first port (21) having a shorter distance from the outlet port (14) than the second port (22).

7. A container according to claim 4, wherein the mobile element (15) comprises a projection (61), the second inlet port (9) is defined by an annular wall (12b) and the projection (61) slides in the annular wall (12b), a seal ring (62) being interposed so that the second inlet port (9) is connected in a fluid-tight manner to the duct (C) both when the mobile element (15) is in the closing position and when the mobile element (15) is in the opening position.

8. A container according to claim 1, wherein the first and the second inlet port (2, 9) are on opposite sides of the outlet port (14) with respect to the inner volume (7).

9. A container according to claim 8, wherein the first and the second port (2, 9) are concentric.

10. A container according to claim 8, wherein the first and the second inlet port (2,9) are defined by a snap connecting projection (R) of the container.

* * * * *